(12) United States Patent
Loureiro et al.

(10) Patent No.: US 7,338,982 B2
(45) Date of Patent: Mar. 4, 2008

(54) FUNCTIONALIZED MESOPOROUS SILICATE STRUCTURES, AND RELATED PROCESSES

(75) Inventors: Sergio Paulo Martins Loureiro, Saratoga Springs, NY (US); Mohan Manoharan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 242 days.

(21) Appl. No.: 10/869,711

(22) Filed: Jun. 15, 2004

(65) Prior Publication Data
US 2004/0228787 A1    Nov. 18, 2004

Related U.S. Application Data

(63) Continuation-in-part of application No. 10/330,962, filed on Dec. 23, 2002, now abandoned.

(51) Int. Cl.
C08G 79/00 (2006.01)
C08G 79/14 (2006.01)
C01B 33/36 (2006.01)

(52) U.S. Cl. ............ 521/154; 521/153; 423/336; 423/338; 423/328.1; 423/328.2

(58) Field of Classification Search ............. 423/336, 423/338, 328.1, 328.2; 523/218, 219; 521/154, 521/153
See application file for complete search history.

(56) References Cited

U.S. PATENT DOCUMENTS 6,334,988 B1 * 1/2002 Gallis et al. ............ 423/326

OTHER PUBLICATIONS

"Dilute Lamellar and $L_3$ Phases in the Binary Water-$C_{12}E_5$ System", R. Strey et al, J.Chem. Soc. Faraday Trans., 1990, vol. 86(12), pp. 2253-2261.

"Lamellar and $L_3$ Phases in the 'Simple' $H_2O$-$C_8E_5$-1-Octanol System: Evidence of Synergism", M. Penders et al, J. Phys. Chem., 1995, 99, pp. 6091-6095.

"Surfactant Self-Diffusion in $L_3$ Phases", A. Ott et al, Langmuir, vol. 8, No. 2, 1992, pp. 345-347.

"Equilibrium and Nonequilibrium Properties of Nonionic Surfactant Membranes", Le, Thao D.; Lund University Dissertations, 2000 (Website Print-out, Address: http://theses.lub.lu.se/postgrad), (3 pages).

"Lipid Bilayers Versus Monolayers—Sponge Phases and Skin Lipid Domains", Ekelund, K., Lund University Dissertations, 2000 (Website Print-out, Address: http://theses.lub.lu.se/postgrad), (4 pages).

* cited by examiner

*Primary Examiner*—Duc Truong
(74) *Attorney, Agent, or Firm*—Paul J. DiConza; William E. Powell, III

(57) ABSTRACT

A mesoporous material is described. It includes a network of interconnected pores within an L3 phase structure. The pores include pore walls of a silicate material functionalized with at least one metal cation—usually a transition metal. Articles which include the mesoporous material are also disclosed, along with methods for making the mesoporous material.

21 Claims, 5 Drawing Sheets

FUNCTIONALIZED MESOPOROUS SILICATE STRUCTURES, AND RELATED PROCESSES

This Application is a continuation-in-part application of Ser. No. 10/330,962, filed on Dec. 23, 2002 now abandoned.

TECHNICAL FIELD

In a general sense, this invention relates to silicate materials. More specifically, it relates to mesoporous silicate structures, and methods for functionalizing such structures.

BACKGROUND OF THE INVENTION

Silicate materials with designed porosity are useful for a number of applications in the chemical, biological, optical, and electronics industries. Of particular interest are the mesoporous silicates, as described, for example, by A-S. Malik et al, Mat. Res. Soc. Symp. Proc., Vol. 658, Materials Research Society, 2001 (GG7.51-7.5.5). The mesoporous materials can be formed into optically transparent, monolithic structures. Formation is sometimes based on the "surfactant L3 phase". Such a phase is known in the art, and is often prepared by combining water, hexanol, and a surfactant such as cetylpyridinium chloride (CPC).

One of the first descriptions of the synthesis of a continuous, mesoporous silicate structure is provided by K. M. McGrath et al, "Science", Vol. 277, Jul. 25, 1997, pp. 552-555. In that preparation, the lyotropic surfactant L3 phase was used as a template for the silicate L3 phase. The resulting structure had a variety of unique characteristics, such as optical isotropy, adjustable pore size, and uniform pore structure. Moreover, the structure had a very high surface area, and the pores could be accessed from many points on the surface.

The mesoporous structure described in the McGrath article includes a network of interconnected pores. The walls of the pores are formed of the silicate material, and they divide an associated liquid medium (e.g., water) into two volume fractions. The overall composite structure provides potential locations for functionalization with a variety of reactive groups. As an example, functionalization can occur within the interconnected pore network, or between the silicate layers which constitute the walls of the pores.

The Malik article provides a good example of one type of functionalization. In that illustration, a mesoporous silicate structure is "impregnated" with photopolymerizable monomers. Malik et al report that a laser could be used to selectively polymerize the monomers, so as to potentially create patterns on the composite. In this manner, unique opto-electronic properties could be obtained. The article also alludes to the frequent difficulty in forming mesoporous structures which are physically stable, and which have the strength to accommodate practical end uses.

Still, functionalization of the "scaffold" of the mesoporous silicate layer can potentially open up many new opportunities for these materials. Some of the possible applications are described in the articles mentioned above, but future work could greatly expand the opportunities. As an example, a functionalized mesoporous network structure could serve as the electrolyte for any type of device that may require a continuous path of electrical conductivity, e.g., a fuel cell.

As another example, a mesoporous structure of this type could be used as a biomolecular sensor. The ability to control the size of the mesopores would allow one to "tune" the sensor to accommodate selected molecules of the biological agent. As yet another potential application, these mesoporous structures could be used as filters for various separation processes, e.g., removal of heavy metals or other contaminants from the environment.

In many of these potential uses for mesoporous structures, it is the functionalization itself which may be the greatest factor in enhancing the application. As an illustration in the case of the biosensors, the mesopores in the structure may provide an initial "screening" for biological agents. However, much greater precision in screening could subsequently be obtained by incorporating a number of functional groups into the structure. As one example, the groups could be selected according to chemical compatibility or incompatibility with the agents, or with any "markers" associated with the agents.

It should thus be apparent that there is considerable interest in finding new ways to functionalize mesoporous silicate structures. The new processes should be capable of providing selected, functional sites in a number of locations within the structural network. Moreover, the functionalization processes should be generally compatible with available techniques for making the structures. For example, they should not add excessive cost to the overall manufacturing operations. Furthermore, it would be helpful if the new processes generally maintained the physical integrity of the mesoporous structure.

BRIEF DESCRIPTION OF THE INVENTION

One embodiment of the present invention is directed to a mesoporous material, comprising a network of interconnected pores within an L3 phase structure. The pores include pore walls of a silicate material functionalized with at least one metal cation—usually a transition metal. In preferred embodiments, the walls of the pores form continuous, opposing silicate layers, spaced from each other, so as to define a channel contained within the walls. Typically, the channel contains a solution of water and surfactant, as described below:

In some embodiments, the process for forming the mesoporous material of this invention involves three general steps. They are depicted in FIG. 1. Step 1 involves template formation, i.e., formation of the L3 phase ("L$_3$"). The phase is prepared in stage 50 by combining a solvent, surfactant, and optionally, a catalyst, as described below. The template L3 phase is then co-templated by the addition of metal ions, in stage 52. Resin formation is then carried out in stage 54, by combining the templated surfactant L3 phase with a resin precursor, to form a silicate L3 phase. Reaction with the precursor as described herein results in the mesoporous silicate structure 56, functionalized with the metal cations.

Another embodiment of the invention is directed to an article which includes the mesoporous material described herein. The pore walls of the mesoporous material contain at least one randomly-dispersed, transition metal cation. The article can be in the form of a number of devices, such as opto-electronic devices, separation filters, biomolecular sensors, and fuel cells. As alluded to above, the mesoporous material may serve a variety of important functions in such devices.

Further details regarding the various features of this invention are found in the remainder of the specification, and in the accompanying drawings.

DETAILED DESCRIPTION OF THE INVENTION

Figure 1:
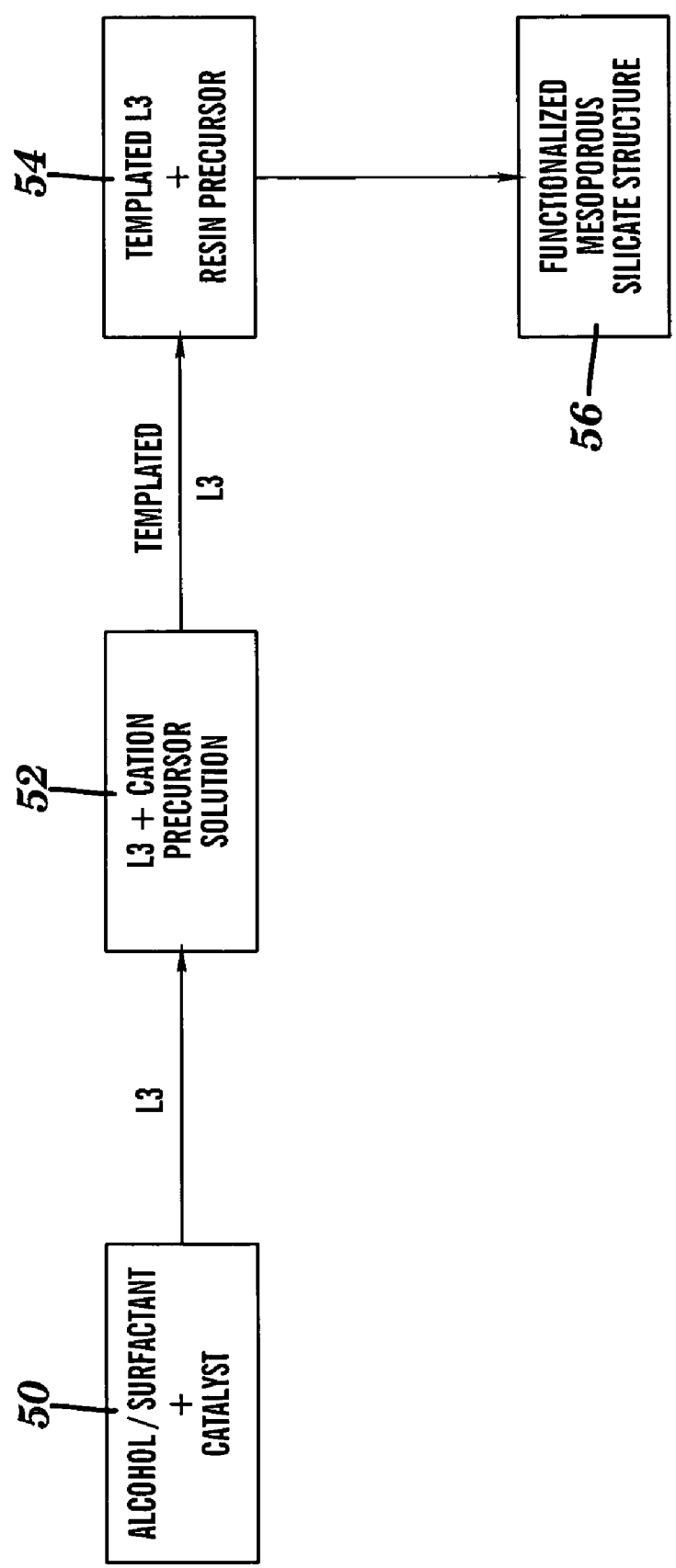
FIG. 1 is a simple flow chart of one embodiment of the process of the present invention.

The mesoporous material described herein is based on a silicate material. As used herein, the term "silicate" is meant to embrace a substantially cross-linked network generally derived from tetra-oxygenated silicon groups. A non-limiting example of such a group is silicon oxide. Some exemplary silicate materials are generally described in U.S. Pat. No. 6,423,770 (H. Katz), which is incorporated herein by reference. (The Katz patent mentions L3 phase materials, but primarily relates to other silicate materials which are not present as the L3 phase.) Materials in which trioxygenated silicon is incorporated, such as those derived in part from organotrialkoxysilanes, are also considered "silicates" for the purposes of this invention. The silicates can be prepared by a number of techniques which are known in the art. The Katz patent describes suitable preparation techniques, as does the McGrath et al article mentioned above ("Science", Vol. 277, Jul. 25, 1997): The McGrath et al reference is also incorporated herein by reference.

As mentioned above, the first step of the process usually involves template formation, i.e., formation of the L3 phase ("$L_3$"). The templating mixture provides a means to adjust or "tune" the morphology of the final silicate material. The phase arrangement produced with the templating mixture generally depends on the quantity and types of components in the mixture. In most embodiments, the templating mixture comprises at least one surfactant, at least one alcohol, and water.

Specific materials required for the formation of the L3 phase are described in various references. They include the McGrath et al article in "Science", mentioned above. L3 phase materials are also described in "Silica Gels With Tunable Nanopores Through Templating of the $L_3$ Phase", K. McGrath et al, Langmuir 2000, 16, pp. 398-406, which is also incorporated herein by reference. Other articles which discuss the formation of the L3 phase are as follows: "Surfactant Self-Diffusion in $L_3$ Phases", A. Ott et al, Langmuir, February 1992 (Vol. 8, No. 2), pp. 345-347; and "Lamellar and $L_3$ Phases in the 'Simple' $H_2O$—$C_8E_5$-1-Octanol System: Evidence of Synergism", M. Penders et al, J. Phys. Chem. 1995, 99, pp. 6091-6095. Both of these references are also incorporated herein by reference.

As described in various references like those mentioned above, certain surfactants can be used in the templating mixture, to form the L3 phase. One example of a suitable surfactant is cetylpyridinium chloride (CPC). Those skilled in the art understand that most surfactants are not suitable for forming an L3 phase. For example, cetyltrimethylammonium bromide (CTAB) cannot be used to form a thermodynamically-stable, pure L3 single-phase.

A number of alcohols can be used in the templating mixture. In some preferred embodiments, the alcohol is moderately polar, and contains about 4 to about 10 carbon atoms. Non-limiting examples of the alcohols are 1-pentanol, 1-hexanol, 1-heptanol, and 1-octanol. Other alcohols of similar polarity may also be employed, such as 2-hexanol; 2-methyl-1-pentanol, and the like. A single alcohol may be employed, but mixtures of alcohols are also possible. (Those skilled in the art can determine if the particular alcohol is suitable for formation of the silicate L3 phase, without undue experimentation).

A catalyst is also preferably incorporated into the templating mixture, to promote curing of the final resin composition. Usually, the catalyst is a volatile acid. Non-limiting examples include HCl, $BCl_3$, $SiCl_4$, $HNO_3$, $CF_3COOH$, and HBr. Choice of a specific catalyst will depend in part on its compatibility with the overall process of silicate formation. For example, the catalyst should be one which does not have an adverse effect on the characteristics of the silicate structure, and any functional sites contained therein. The amount of catalyst used is that which provides sufficient acidity for the hydrolysis and condensation of the silicate precursors to proceed at a desirable rate. As described in the Katz patent, the catalyst may be added directly, or generated in situ, e.g., by chemical transformation of a reagent. (It should also be understood that in terms of the chemistry of the L3 phase, at least some of the alcohols described above, e.g., hexanol, can also function as catalysts. However, they are sometimes referred to as "co-solvents").

The L3 silicate sponge phase exists within a narrow region of the phase diagram which plots the alcohol/surfactant ratio as a function of solvent content. (See FIG. 2, for example, in "Silica Gels with Tunable Nanopores Through Templating of the $L_3$ Phase", K. McGrath et al, Langmuir 2000, 16, pp. 398-406. This article is incorporated herein by reference). Thus, the ratio of alcohol to surfactant should be maintained to promote formation of an L3 phase which is thermodynamically-stable, i.e., a phase which is substantially homogeneous and macroscopically visible as an individually-distinct component. The specific ratio will depend in large part on the identity of surfactant, alcohol, and catalyst. In the case of a cetylpyridinium chloride surfactant in admixture with 1-hexanol (and using HCl as a catalyst), the hexanol/CPC ratio (by weight) will preferably be in the range of about 100:87 to about 100:80. The level of catalyst (total catalyst, e.g., including solvents like hexanol) will usually range from about 65% by weight to about 95% by weight, based on the total weight of the templating mixture.

As described by McGrath et al (Langmuir), the L3 phase, formed by combining the surfactant, water, and alcohol, results from the self-assembly of amphiphiles. The phase includes a three-dimensional, random packing of a multiply-connected, continuous membrane. The membrane evenly divides the solvent into two continuous volumes. The phase is sometimes described in the art as a 3-dimensional, continuous bilayer structure, wherein a surfactant bilayer of highly connected topology forms a dividing surface separated by two solvent domains. The resulting convoluted, sponge-like structure contains randomly distributed mesopores interconnected in various directions. The L3 structure is also sometimes referred to as a "liquid crystalline phase", e.g., see "Disordered Mesoporous Silicates Formed by Templation of a Liquid Crystal ($L_3$)", A-S. Malik et al, Mat. Res. Soc. Symp. Proc., Vol. 658, 2001 (pp. GG7.51-7.5.5), which is incorporated herein by reference.

The L3 phase is optically isotropic and water-clear. Both of these properties can be very useful in a matrix or composite-product. Moreover, the phase has a viscosity comparable to that of water. This characteristic is beneficial for various mixing operations.

As mentioned above, the walls of the mesoporous structure of this invention are functionalized with at least one metal cation. A variety of metal cations may be employed. Transition metals are typically used, such as titanium, vanadium, chromium, manganese, iron, cobalt, nickel, copper, zinc, zirconium, and hafnium. Choice of a particular metal (or mixture of two or more metals) will depend in part on the type of functionalization desired. As an example, solid oxide fuel cells often use yttria-stabilized zirconia particles. Thus, if the mesoporous material of this invention were to be used in such a device, e.g., as an electrolyte, the cation could be zirconium. In some preferred embodiments, the transition metal is selected from the group consisting of manganese, cobalt; nickel, and mixtures thereof.

Usually, functionalization with the metal cation is carried out by first combining the surfactant L3 phase with some soluble form of the cation, e.g., a "cation precursor". For example, the metal precursor may be in the form of a anhydrous or hydrated metal salt, which itself can be derived from a cationic or anionic species. Non-limiting examples include various metal halides, metal nitrates, metal oxalates, metal phosphates, metal sulfates, and metal chromates, as well as metal-organic salts. The cation precursor should be one which is physically- and chemically compatible with the L3 phase-forming components. The cation precursor should also be compatible with components which will be used to template the growth of a silicate solid, as further described below.

Some illustrative, specific examples of cation precursors for some of the transition metals are as follows:

| | |
|---|---|
| Cobalt: | $CoCl_2 \cdot 6H_2O$; $Co(NO_3)_2 \cdot 6H_2O$; $Co(OOCCH_3)_2 \cdot 4H_2O$; |
| Manganese: | $MnCl_2 \cdot 2H_2O$; $Mn(NO_3)_2 \cdot H_2O$; |
| Copper: | $Cu(C_2H_3OO)_2 \cdot H_2O$; $CuSo_4 \cdot 5H_2O$; |
| Chromium: | $Na_2Cr_2O_7 \cdot 2H_2O$; |
| Titanium: | $TiCl_4$; |
| Hafnium: | $HfCl_4$; and |
| Zirconium: | $ZrCl_4$. |

Those of skill in the art are aware of other cation precursors which could be employed for a given metal.

The amount of cation which is used will depend on various factors. They include: the ratio between the different constituents in the reactive mixture; the amount of silicate material which is to be combined with the functionalized L3 phase; and the intended use of the final material. Usually, the concentration of metal cation (total cation) incorporated into the L3 phase will range from about 0.1M to about 2M. In some preferred embodiments, the amount will range from about 0.1M to about 1M.

A variety of techniques may be employed to combine the cation with the L3 phase. Mixing is usually carried out at room temperature, using any suitable container. Mixing conditions which result in a homogenous product are maintained. For example, care is taken to ensure that the metal cations do not precipitate out of the mixture.

After the metal cation (or mixture of cations) has been incorporated into the L3 phase, the resin formation step can be carried out. Various methods for resin formation are possible. Several are taught in the McGrath et al (Langmuir) article and Katz patent discussed previously. In one embodiment, a silicate resin precursor can be added directly to the cation-containing L3 phase, with gentle mixing. (The reaction is exothermic). The addition of the precursor should be carried out relatively slowly, so as to maintain a system temperature which minimizes the evaporation of any of the solvents.

A variety of resin precursors may be employed. They are usually alkoxysilanes, e.g., tetraalkoxy silanes, trialkoxy silanes, dialkoxysilanes, and monoalkoxysilanes. Non-limiting examples of the alkoxysilanes include methyltrimethoxysilane; triethoxysilane; 1,4-bis(trimethoxysilylethyl)benzene (BSEB); tetraethoxysilane (TEOS); and tetramethoxysilane (TMOS). Mixtures which include one or more of these silanes can also be used.

Selection of particular silanes will depend in part on the characteristics desired for the final silicate product. For example, TMOS is sometimes preferred because it can lead to high mechanical strength for the product, as described in the Katz patent. In contrast, tetraoxygenated precursors can impart a high modulus and low coefficient of thermal expansion to the final material. On the other hand, incorporation of organotrialkoxy silanes can impart increased toughness to the material, while also providing it with a more hydrophobic surface. Those skilled in the art will be able to select the most appropriate precursor or combination of precursors, based on the intended end use for the material.

The resin mixture may further include additional silanes, as described in the Katz patent. For example, tetraalkoxy and trialkoxy silanes with three or four leaving groups, such as chloro, acetoxy, and alkoxy, can be incorporated into the resin precursor. Dialkoxysilanes and monoalkoxysilanes may also be incorporated, but not in quantities that would excessively lower the cross-link density of the resin. (Lowering the cross-link density could lead to softening of the final silicate material). Moreover, silanes with larger substituents, such as phenyl groups, may also be incorporated, since they can impart desired functionality, such as a high refractive index. However, they should not be used in quantities which would adversely affect the microstructure or mechanical strength of the final silicate material. The same caveat exists for other element oxides which might be incorporated. As a general rule, the precursors should be chosen so that their reactivity is suitable for forming a homogeneous resin.

Prior to being added to the L3 phase, the silicate resin precursor can first be mixed with a co-solvent. Examples of co-solvents are methanol, ethanol, 1-propanol, isopropanol, and mixtures thereof. (Preferably, the co-solvent is volatile, so as not to become excessively incorporated into the resin or the final material). The co-solvent helps to provide homogenous mixing of the resin precursor with the water, and with any catalyst that might be employed.

Silicate resin formation usually takes place at temperatures of about 30 ° C. to about 130° C., but this will depend on the components present, mixing parameters, and the like. During the reaction, some of the volatile components may be removed. However, care is taken to ensure that some solvent remains in the resin, if its presence is beneficial for shaping operations, like injection molding. An additional heating step is sometimes undertaken to further cure the resin product at this stage. Degassing steps can also be undertaken.

Variations on the general process described above are possible, and within the scope of the present invention. For example, the resin formation process can be divided into two stages. A pre-cured resin mixture from an initial resin formation step can be combined with additional L3 templating mixture, and with additional resin precursor material, to form a "final resin mixture". In some instances, the two-stage approach can result in materials that are more stable to annealing, drying, and solvent exchange.

After the initial formation of the silicate resin, the material can be formed into any desired shape by conventional techniques. Molding processes are usually used, e.g., injection molding. However, other techniques are also possible, such as casting, printing, extruding, coating, and the like.

Most of the remaining volatile components can then be removed. Various techniques are possible, e.g., controlled heating, supercritical drying, supercritical fluid extraction, and the like. Additional, conventional processes can be employed to transform an initially-shaped product into final form, e.g., by contouring it. Illustrative techniques include carving, skiving, embossing, and the like.

The functionalized silicate material may be fully or partially cured prior to shaping. (It should be understood that a partially cured material may continue to cure during the shaping process itself). Curing can be undertaken at room temperature. However, the curing can be accelerated by various methods. They include one or more of the following, as an illustration: increasing the temperature; using supercritical fluid extraction; or exposing the material to various energy sources. (Exemplary energy sources are microwave energy and ultraviolet light). The amount of thermal energy required for heating will depend on the particular components in the molded product.

A variety of factors may be considered in maintaining or adjusting the characteristics of the formed silicate material. In general, one can vary the types and ratios of mixture components for templating and resin formation. Process conditions can also be varied.

Some of the specific component parameters that can be adjusted include: resin and surfactant molecular weight and functionality; water concentration; the nature of the alcohols; types of resin precursors and catalysts; and types of functionalizing precursors; as well as the reactivity of the resins and resin precursors. Some of the specific process parameters that can be adjusted include: the duration and method of mixing and degassing; temperature and duration of curing; and the degree to which the volatiles are retained or released during cure (as described in the Katz patent).

Additional parameters are associated with the supercritical fluid extraction process, as those skilled in the art understand. Those parameters include gas pressure, temperature, time, and types of solvents employed. (This process is often very useful for removing volatile materials from the mesoporous structures of this invention. It permits removal of the volatiles under a specified pressure regimen, while retaining structural integrity).

The adjustments noted above can be made to provide specific attributes for the functionalized, mesoporous resin product. These are attributes which are desirable or necessary for the type of device or product in which the resin product is incorporated. Some of the primary attributes for various end uses are porosity (e.g., pore size), dielectric constant, structural and mechanical stability; refractive index contrast; reactivity; optical absorption; total and in-line transmission; and electrical-, ionic- and gaseous conductivity.

As alluded to previously, pore size can often be a very important factor for the mesoporous structures. In general, the L3 mesoporous structures include pores of fairly uniform dimension. As described in the McGrath et al article (Science 1997), the dimensions of the pores can be readily controlled or "tuned" by adjusting the concentration of components in the initial surfactant solution. For many end uses, the size of the pore (e.g., its largest dimension—an approximate diameter for pores with substantially circular openings) will range from about 1 nanometer to about 100 nanometers.

Figure 2:
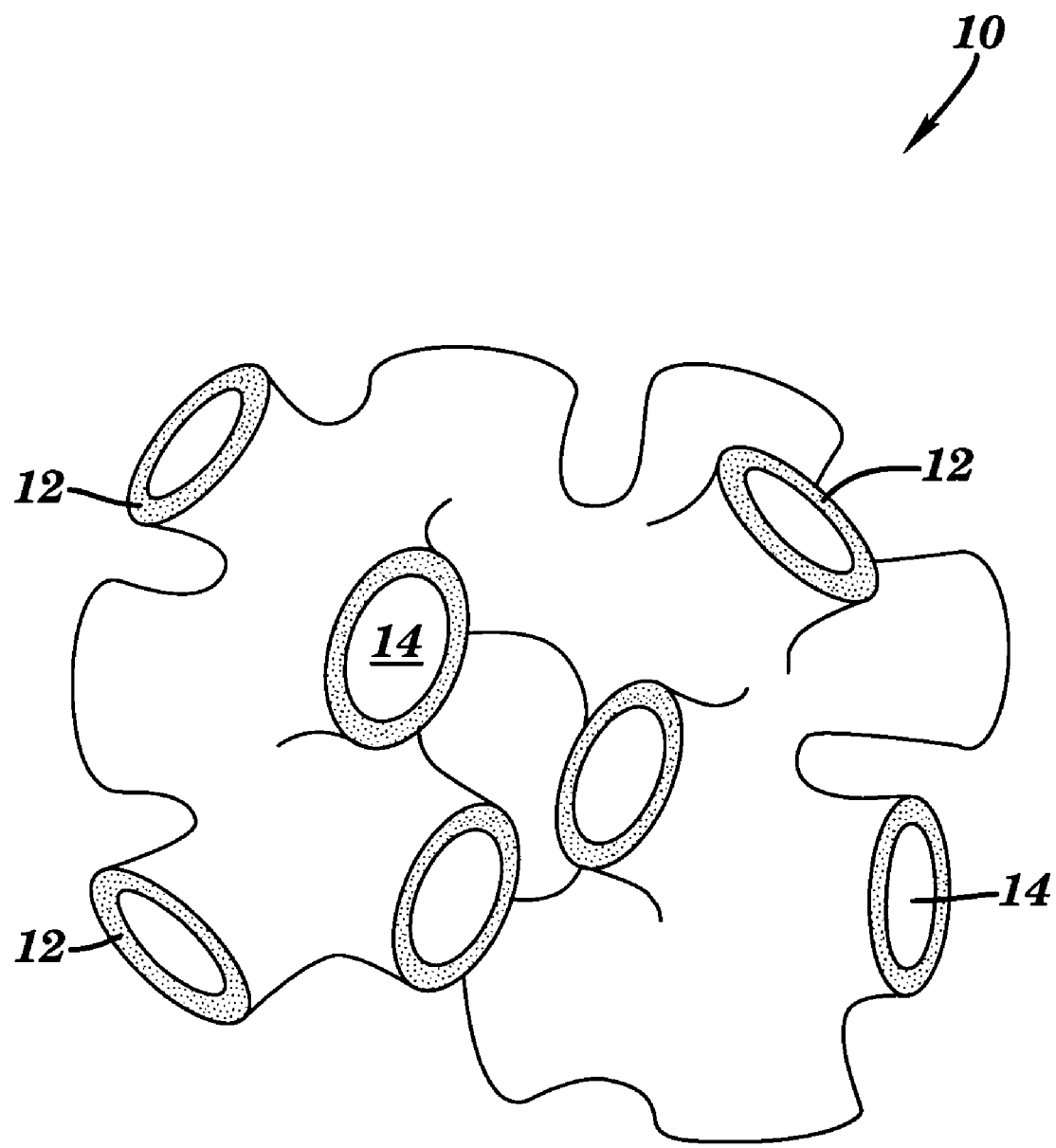
FIG. 2 is a depiction of a mesoporous, silicate structure formed from the L3 phase.

FIG. 2 is depiction of a mesoporous structure 10, based on the L3 phase described previously. The structure includes randomly-distributed mesopores 12, which include pore openings 14. The mesopores are usually interconnected in three dimensions. (As described in the Malik article referenced above, the random interconnections of the pores in three dimensions provides the structure with short range order). Mesoporous structure 10 is typically isotropic and transparent.

Figure 3:
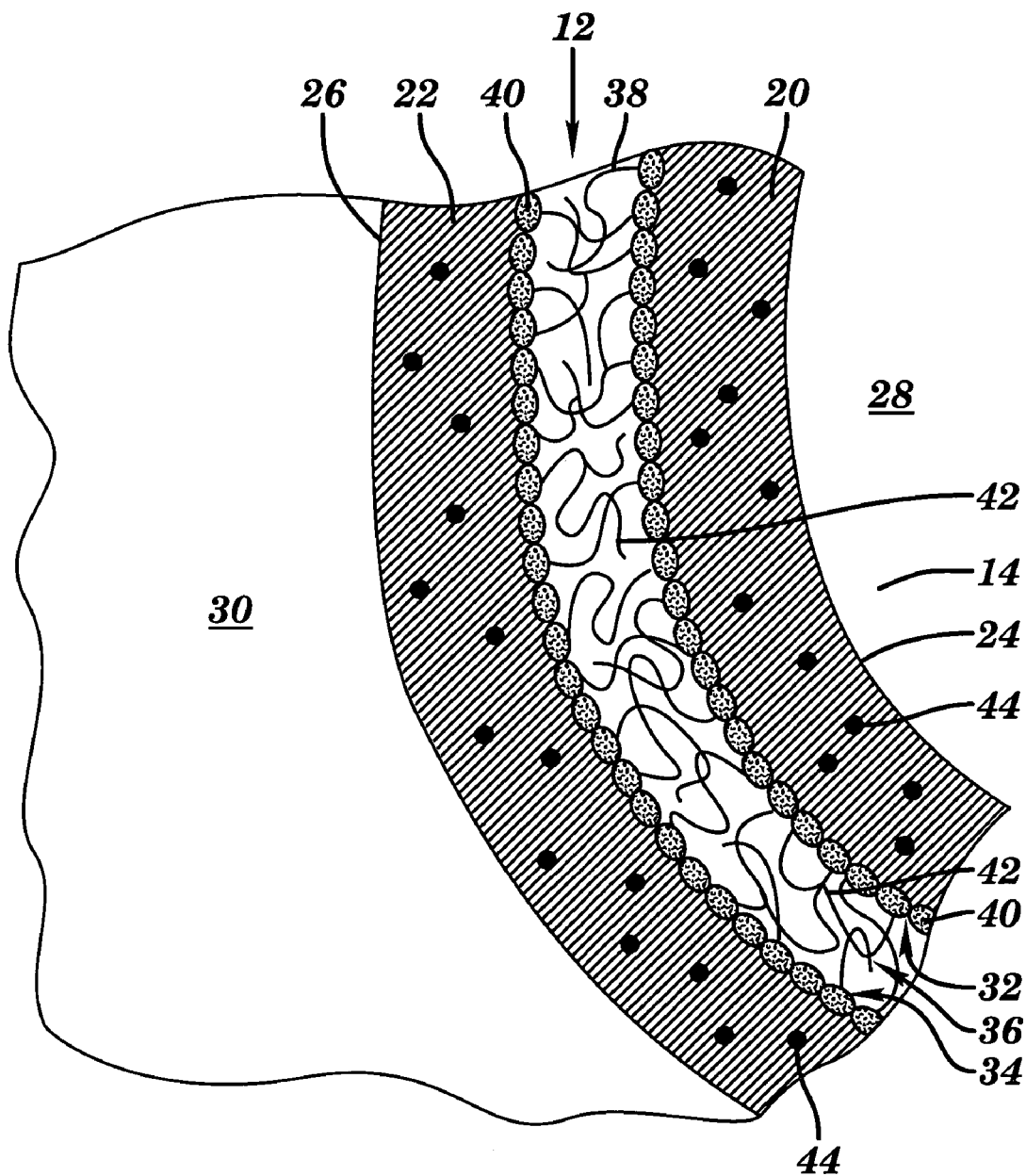
FIG. 3 is a cross-sectional view of a portion of one of the mesopore openings in the silicate structure of FIG. 2.

FIG. 3 is a depiction of a cross-section of one of the pore openings 14 of FIG. 2, in magnified form. Opening 14 includes pore walls 20 and 22, spaced from each other. As described above, the walls are usually formed of a silicate-based material. The exterior surface of each wall 20, 22 (i.e., elements 24, 26, respectively) is in contact with aqueous (usually water) sub-volumes 28 and 30, respectively. The interior surface of each wall 20, 22 (i.e., elements 32, 34, respectively) forms the channel 36 of mesopore 12.

Channel 36 contains a solution of the surfactant 38, as described previously, e.g., a solution comprising alcohol or alcohol/water. Surfactant 38 includes polar heads 40, and non-polar tails 42. The polar heads of the surfactant are generally hydrophilic, and are attracted to aqueous sub-volumes 28, 30. The non-polar tails are generally hydrophobic, and remain within the volume of channel 36.

As described above, silicate pore walls 20 and 22 contain randomly dispersed metal cations 44. The metal cations are chemically bonded within the silicate matrix—presumably by way of M-O—Si linkages, where M is the cation. The cations serve to functionalize the silicate layers, and their selection depends on the type of functionalization desired. The type of functionalization is also a factor in determining the amount of cations present. In general, about 0.1 to about 2 moles cation are utilized for every mole of silicate. The silicate material retains its disordered structure after cation-functionalization, which is advantageous in many instances. For example, such a structure allows true, random distribution of the cation in the silicon matrix.

EXAMPLES

The examples which follow are merely illustrative, and should not be construed to be any sort of limitation on the scope of the claimed invention.

Example 1

An L3 phase was first prepared by mixing 1.86 g cetylpyridinium chloride (CPC) with 2.14 g hexanol and 16 g (80 wt. %) of 0.2 M hydrochloric acid in water. (The ratio of hexanol to CPC was maintained at 1.15). The ingredients were stirred for about 10 minutes, until a substantially translucent, viscous solution was formed, i.e., an L3 phase.

The L3 phase was then functionalized with cobalt cations. In this step, a series of compositions were prepared by mixing the L3 solution with varying levels of $CoCl_2 \cdot 6H_2O$. For these samples, the cobalt hydrate concentration ranged from about 0.1M to about 2M.

Varying amounts (25 g-55 g) of tetramethoxysilane (TMOS) were then slowly added to the samples, and the temperature increased to about 60° C. After stirring for about 60 minutes, portions of the solution were poured into molds, so that they could cool and gel into a desired shape.

In general, the $CoCl_2.6H_2O$ powder, initially violet in color, turns red when solubilized. The intensity of the color increases as a function of the solution concentration. When the $CoCl_2.6H_2O$ hydrates are added to the L3 phase in this experiment, with TMOS present, an exothermic hydrolysis reaction occurs. The silicate color becomes dark blue/purple, and transparent. After gelation, the optically-clear, monolithic material turned to a violet color, but maintained the same type of color variation, as a function of the solution concentration.

An X-Ray Diffraction (XRD) pattern was obtained for the cobalt-functionalized silicate-L3 phase. As those skilled in the art understand, the diffraction pattern provides an expression of peak intensity as a function of "2-theta" values. In this instance, the XRD pattern was notable for the complete absence of diffraction peaks from cobalt chloride or cobalt oxide. The absence of these peaks is a clear demonstration that cobalt does not precipitate out of the functionalized L3 phase. Instead, the metal has become incorporated into the silicate matrix, which still retains its disordered structure.

Various monoliths of the functionalized mesoporous material were obtained in this example. They were violet-colored and transparent. A typical monolith was in the general shape of a rectangular solid, e.g., with dimensions of about 2.5 cm×0.5 cm×0.5 cm. When slowly dried, the monolith retained its homogenous, violet color. This demonstrates that cobalt is randomly distributed within the silicate network.

Figure 4:
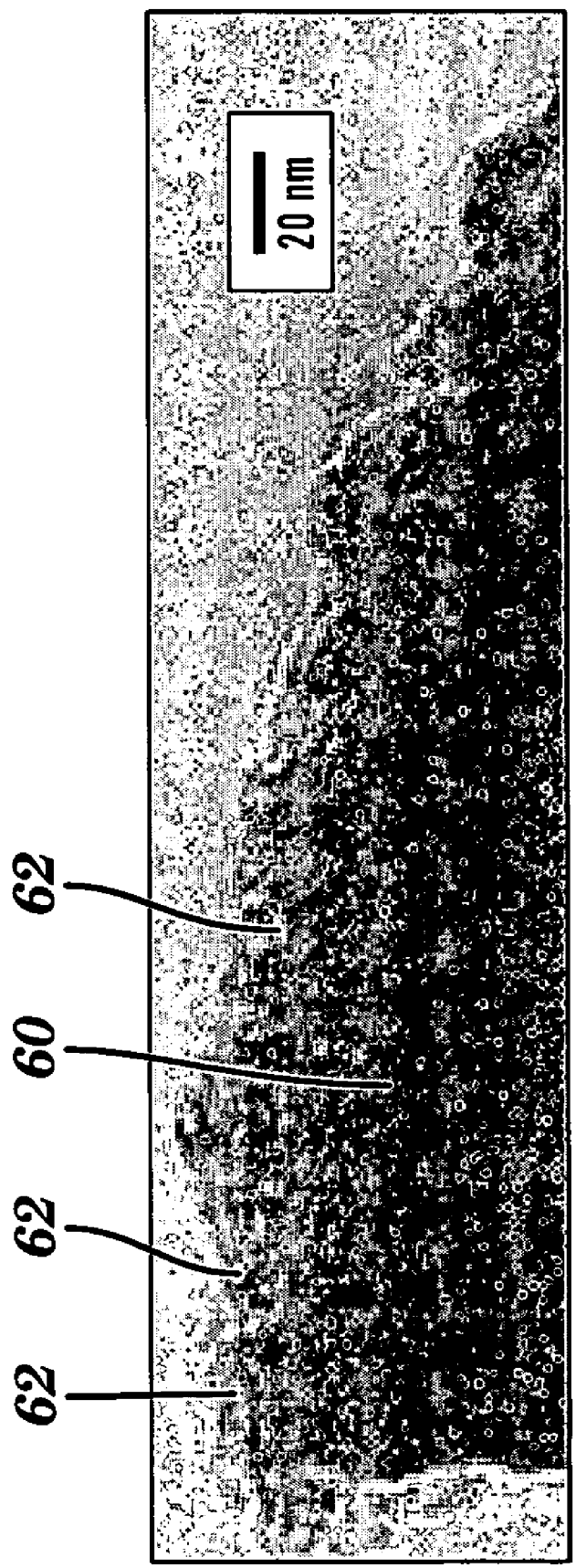
FIG. 4 is an image (transmission electron microscopy) of a portion of a functionalized L3 phase mesoporous structure.

FIG. 4 is an image of a portion of a cobalt-functionalized silicate-L3 phase, obtained by transmission electron microscopy (TEM). The functionalized L3 material was substantially identical to that prepared in Example 1. (As part of sample preparation for TEM, it was pulverized and then calcined at 500° C. in air, for 4 hours).

The figure highlights a section of the silicate material 60. In that section, a large number of mesopores 62 are evident (the "whitish" and light-gray spots). It should also be noted that the material is fairly homogenous. For example, there does not appear to be any islands of cobalt oxides present.

Figure 5B:
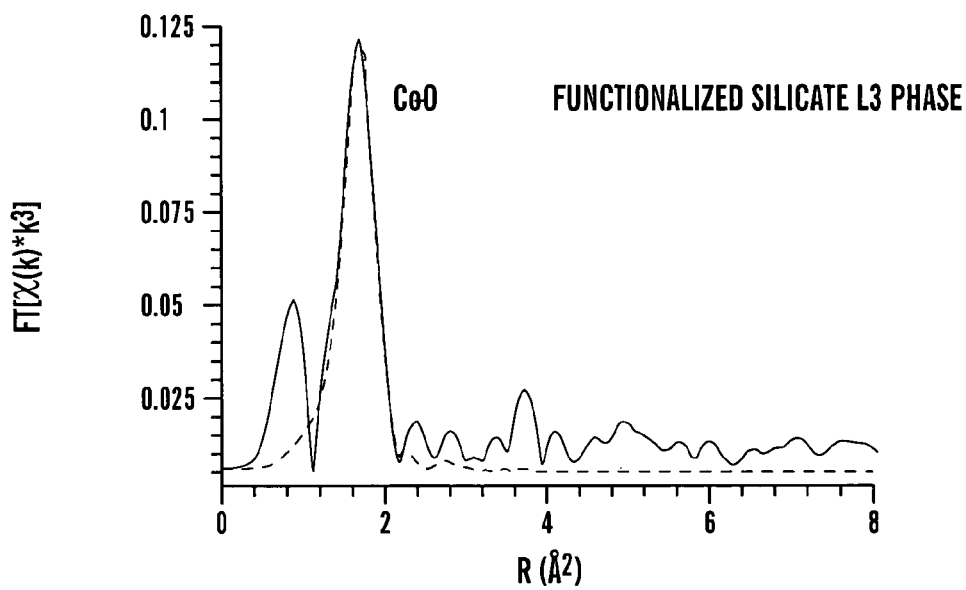
FIG. 5 is a set of Fourier-transformed EXAFS (Extended X-Ray Absorption Fine Structure) spectra for a functionalized silicate structure and related materials used in its synthesis.
Figure 5A:
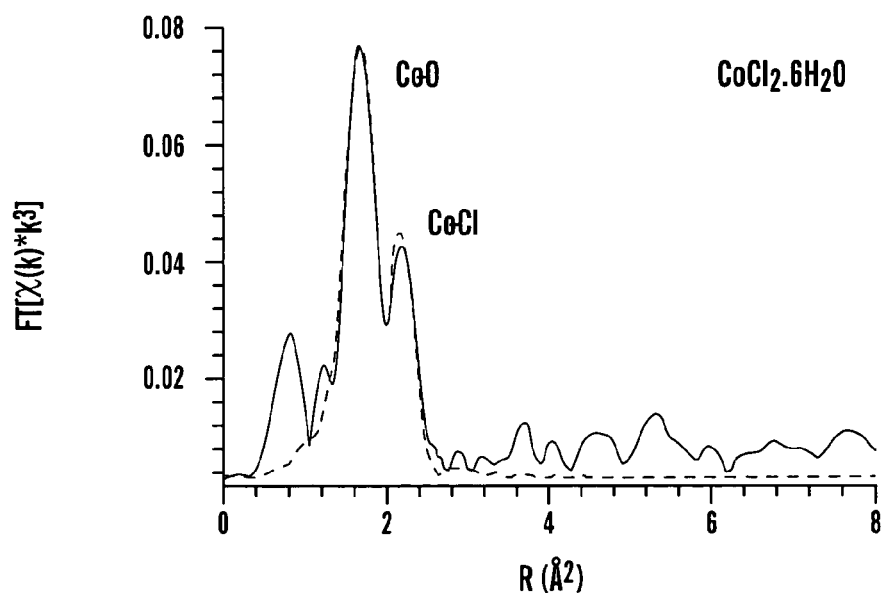

FIG. 5 includes two, Fourier-transformed EXAFS (Extended X-Ray Absorption Fine Structure) spectra. (Conventional EXAFS y-axis and x-axis units are expressed). The spectra of FIG. 5A is based on a sample of the $CoCl_2.6H_2O$ salt, i.e., prior to reaction with an L3 phase. The spectra of FIG. 5B is based on analysis of the cobalt-functionalized material ("FSL3"), i.e., a material substantially identical to that discussed in regard to FIG. 4). In regard to the inset-portions, measurements are provided for each type of chemical bond relative to the silicate phase. "N" is the number of cobalt-coordination; "R" is the distance between the central atom (cobalt) and the coordinating atom (O/Cl); and "$\sigma^2$" is the disorder parameter. The parameters were refined to obtain the optimum fit between experimental and calculated spectra by using a "WinXAS" computer program for analyzing EXAFS data. The EXAFS phase and amplitudes were calculated by using an "FEFF7" computer program based on the structural model of $CoCl_2.6H_2O$.

There are significant differences between the spectra of FIG. 5A and that of FIG. 5B, in regard to both the coordination species and the coordination environment. The $CoCl_2.6H_2O$ salt and the FSL3 phase can be compared. The Fourier peak for Co—Cl bonds disappears in the FSL3 phase (FIG. 5B), indicating that in this phase, cobalt is coordinated to oxygen atoms only. This in turn demonstrates that cobalt has been incorporated into the silicate layers of the L3 structure. It appears that the cobalt is incorporated into the phase as an oxide, since no evidence for precipitation of nanoparticles can be found by diffraction or imaging techniques.

Example 2

Another L3 silicate phase was prepared by mixing cetylpyridinium chloride (CPC) with hexanol and 80 wt. % of 0.2 M hydrochloric acid in water, as in Example 1. (The ratio of hexanol to CPC was maintained at 1.15). The ingredients were stirred until a substantially translucent, viscous solution was formed, i.e., an L3 phase.

The L3 phase was then functionalized with manganese cations. In this step, a series of compositions were prepared by mixing the L3 solution with varying levels (e.g., 0.1M to 1M to 2M) of a dihydrated manganese chloride compound, $MnCl_2.2H_2O$. The manganese chloride, initially a pink powder, becomes brown when solubilized in water. The brown color becomes more intense with increasing concentration in solution. In this instance, 2M solutions of $MnCl_2.2H_2O$ are very dark brown. That color is retained after addition to the L3 phase.

Varying amounts (10 g-55 g) of tetramethoxysilane (TMOS) were then slowly added, with stirring, to the manganese-containing L3 samples, and the temperature increased to about 60° C. For a given sample, addition of about 10-15 g of TMOS resulted in a templated silicate with a faint brown color. The silicate required an extensive time (greater than 10 hours) to gel. When additional TMOS was added to the sample, the gelling process occurred more quickly (e.g., 30 g TMOS for 7-8 hour gel time; 35 g TMOS for 4 hour gel time), and the samples still retained the same, faint brown coloration. However, when 40 g of TMOS were added, the gel time was considerably faster (3 hours), and the final L3 phase became completely clear. An addition of 55 g of TMOS resulted in an even faster gelling process (gel time of 1 hour), and the sample was optically clear.

Moreover, a difference was noted between the "pristine" L3 phase (i.e., without metal cation functionalization) and a manganese-functionalized L3 phase. The pristine phase often exhibited substantial cracking during gelling, due to the evaporation of volatile components. In contrast, the manganese-substituted phases, when prepared with TMOS in excess of 25 g, did not exhibit cracking—even after one week of drying time.

An X-Ray Diffraction (XRD) pattern was obtained for the manganese-functionalized silicate-L3 phase, as in Example 1. As in the case of cobalt, the absence of diffraction peaks arising from manganese chlorides or oxides demonstrated that manganese did not precipitate out of the functionalized L3 phase. Instead, the metal has become incorporated into the silicate structure, which still retains its disordered character. The manganese sample for which the XRD pattern was obtained appeared completely clear to the eye. However, the absorbance spectra of a co-templated sample prepared with 40 g TMOS still showed approximately 4% transmittance at 380 nm.

As in Example 1, EXAFS data was obtained in this instance, for both the manganese-chloride itself, $MnCl_2.2H_2O$, and the substituted manganese oxide/L3 phase. EXAFS analysis revealed that, in the substituted L3 phase, manganese was bonded solely to oxygen atoms. Various chemical bond characteristics from that analysis are provided in Table 1 below:

TABLE 1

| Sample | Bond Type | N | R(angstroms) | $\sigma^2$ |
|---|---|---|---|---|
| $MnCl_2 \cdot 2H_2O$ | Mn—O | 2.0 | 2.12 | 0.013 |
| $MnCl_2 \cdot 2H_2O$ | Mn—Cl | 4.0 | 2.52 | 0.013 |
| Mn in L3 | Mn—O | 6.0 | 2.24 | 0.014 |

The main peak in the EXAFS arose only from Mn—O bonds at 2.24 angstroms. Based on standard ionic radii data for $Mn^{+2}$ and $O^{2-}$[7], this bond length appears to indicate that manganese is at least 6-coordinated. The refined disorder parameter $\sigma^2$ is slightly higher than a typical temperature factor, which may imply some inherent structural disorder. Unconstrained refinement leads to "N=4", and a smaller temperature factor. However, such a coordination number is far too small to explain the observed bond length. The data collectively suggests that manganese is integrated into the silicate structure by way of octahedral coordination, with a slightly large temperature factor.

This invention has been described in terms of certain embodiments. However, it is not intended that the invention be limited to the above description. Accordingly, various modifications, adaptations, and alternatives may occur to one skilled in the art, without departing from the spirit and scope of the claimed inventive concept. All of the patents, articles, and texts which are mentioned above are incorporated herein by reference.

What is claimed:

1. A mesoporous material, comprising a network of interconnected pores within an L3 phase structure, wherein the pores include pore walls of a silicate material functionalized with at least one metal cation.

2. The mesoporous material of claim 1, wherein the metal is a transition metal.

3. The mesoporous material of claim 2, wherein the transition metal is selected from the group consisting of titanium, vanadium, chromium, manganese, iron, cobalt, nickel, copper, zinc, zirconium, hafnium, and combinations thereof.

4. The mesoporous material of claim 3, wherein the transition metal is selected from the group consisting of manganese, cobalt, nickel, and mixtures Thereof.

5. The mesoporous material of claim 1, wherein the walls of the pores comprise continuous, opposing silicate layers, spaced from each other, so as to define a channel contained within the walls.

6. The mesoporous material of claim 5, wherein the channel contains a solution which comprises at least one surfactant.

7. The mesoporous material of claim 6, wherein the surfactant is cetylpyridinium chloride (CPC).

8. An article which comprises a mesoporous material containing a network of interconnected pores within an L3 phase structure, wherein the pores include pore walls of a silicate material functionalized with at least one randomly-dispersed transition metal cation.

9. The article of claim 8, wherein about 0.1 to about 2 moles of transition metal cations are present, per mole of silicate material.

10. An article which comprises a mesoporous material containing a thermodynamically-stable L3 phase, wherein the L3 phase comprises a 3-dimensional, continuous bilayer structure which contains randomly-distributed, interconnected pores, wherein the pore walls comprise a silicate material functionalized with at least one randomly-dispersed transition metal cation.

11. The article of claim 10, wherein the L3 phase is prepared by a process which comprises combining cetylpyridinium chloride (CPC) and at least one solvent suitable for L3 phase formation.

12. An article, selected from the group consisting of opto-electronic devices, separation filters, biomolecular sensors, and fuel cells, and comprising a mesoporous material which itself comprises a network of interconnected pores within an L3 phase structure, wherein the pores include pore walls of a silicate material functionalized with at least one metal cation.

13. A method for preparing a mesoporous material which comprises pores having functionalized, silicate pore walls, comprising the following steps:

(a) combining at least one solvent, at least one surfactant suitable for L3 phase formation, and optionally, at least one catalyst, so as to form a surfactant L3 phase;

(b) combining the surfactant L3 phase with at least one metal cation precursor, to functionalize the phase with the metal cation; and (c) combining the functionalized surfactant L3 phase with at feast one resin precursor, to form the mesoporous material.

14. The method of claim 13, wherein the solvent is an alcohol.

15. The method of claim 14, wherein the alcohol is selected from the group consisting of 1-pentanol, 1-hexanol, 1-heptanol, 1-octanol, 2-hexanol;

2-methyl-1-pentanol, and mixtures thereof.

16. The method of claim 13, wherein the surfactant is cetylpyridinium chloride (CPC).

17. The method of claim 13, wherein the metal cation is a transition metal.

18. The method of claim 17, wherein the transition metal is selected from the group consisting of titanium, vanadium, chromium, manganese, iron, cobalt, nickel, copper, zinc, zirconium, hafnium, and combinations thereof.

19. The method of claim 13, wherein the resin precursor is an alkoxysilane.

20. The method of claim 19, wherein the resin precursor is selected from the group consisting of methyltrimethoxysilane; triethoxysilane; 1,4-bis(trimethoxysilylethyl) benzene (BSEB); tetraethoxysilane (TEOS); tetramethoxysilane (TMOS), and mixtures thereof.

21. The method of claim 13, wherein the mesoporous material formed in step (c) is subsequently cured and formed into a desired shape, followed by removal of substantially all of the volatile content from the material.

* * * * *